(12) United States Patent
Furuyama et al.

(10) Patent No.: US 7,406,093 B2
(45) Date of Patent: Jul. 29, 2008

(54) STATION DISCOVERY PROCESSING METHOD AND WIRELESS COMMUNICATION DEVICE

(75) Inventors: Junko Furuyama, Tokyo (JP); Hisashi Takayama, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 634 days.

(21) Appl. No.: 10/768,008

(22) Filed: Feb. 2, 2004

(65) Prior Publication Data

US 2004/0170134 A1 Sep. 2, 2004

(30) Foreign Application Priority Data

Jan. 31, 2003 (JP) ............................. 2003-023805

(51) Int. Cl.
*H04L 12/413* (2006.01)
(52) U.S. Cl. .................................... 370/445; 455/67.13
(58) Field of Classification Search .................. 455/69, 455/522, 13.3, 14, 41.1, 41.2, 115.3, 135, 455/127.2, 421, 423, 422.1, 67.13, 67.3; 398/135, 162; 370/318, 445
See application file for complete search history.

(56) References Cited

U.S. PATENT DOCUMENTS 6,104,512 A * 8/2000 Batey, Jr. et al. ............ 398/120
6,643,469 B1 * 11/2003 Gfeller et al. ............... 398/162
6,754,451 B1 * 6/2004 Nakamura ................... 398/135

FOREIGN PATENT DOCUMENTS

| JP | 06-169267 A | 6/1994 |
| JP | 07-030482 A | 1/1995 |
| JP | 11220440 A | 10/1999 |
| JP | 2000-349782 A | 12/2000 |

* cited by examiner

*Primary Examiner*—Edward Urban
*Assistant Examiner*—Tu Nguyen
(74) *Attorney, Agent, or Firm*—Browdy and Neimark

(57) ABSTRACT

To perform rapid and sure connection processing in a wireless communication system that performs communication in compliance with a wireless communication method having a congestion control function. A starting station transmits a discovery request frame and determines whether or not data is received from other communication devices in response to transmitted data. As a result of receiving data and checking FCS (Field Check Sequence), if it is detected that a received frame has been destroyed, or if no data is received from the other communication devices, a transmission distance control part decides a new transmission distance and sends a command to control transmission power to a power control part of a transmitting part, and the power control part transmits the discovery request frame again on the basis of the newly decided transmission distance to repeat discovery processing. This prevents a collision of responses from plural communication devices and ensures discoveries of other communication devices.

16 Claims, 12 Drawing Sheets

FIG. 6

| BOF 8bit | ADDRESS 8bit | CONTROL 8bit | INFORMATION M*8bit | FCS 2*8bit | EOF 8bit |

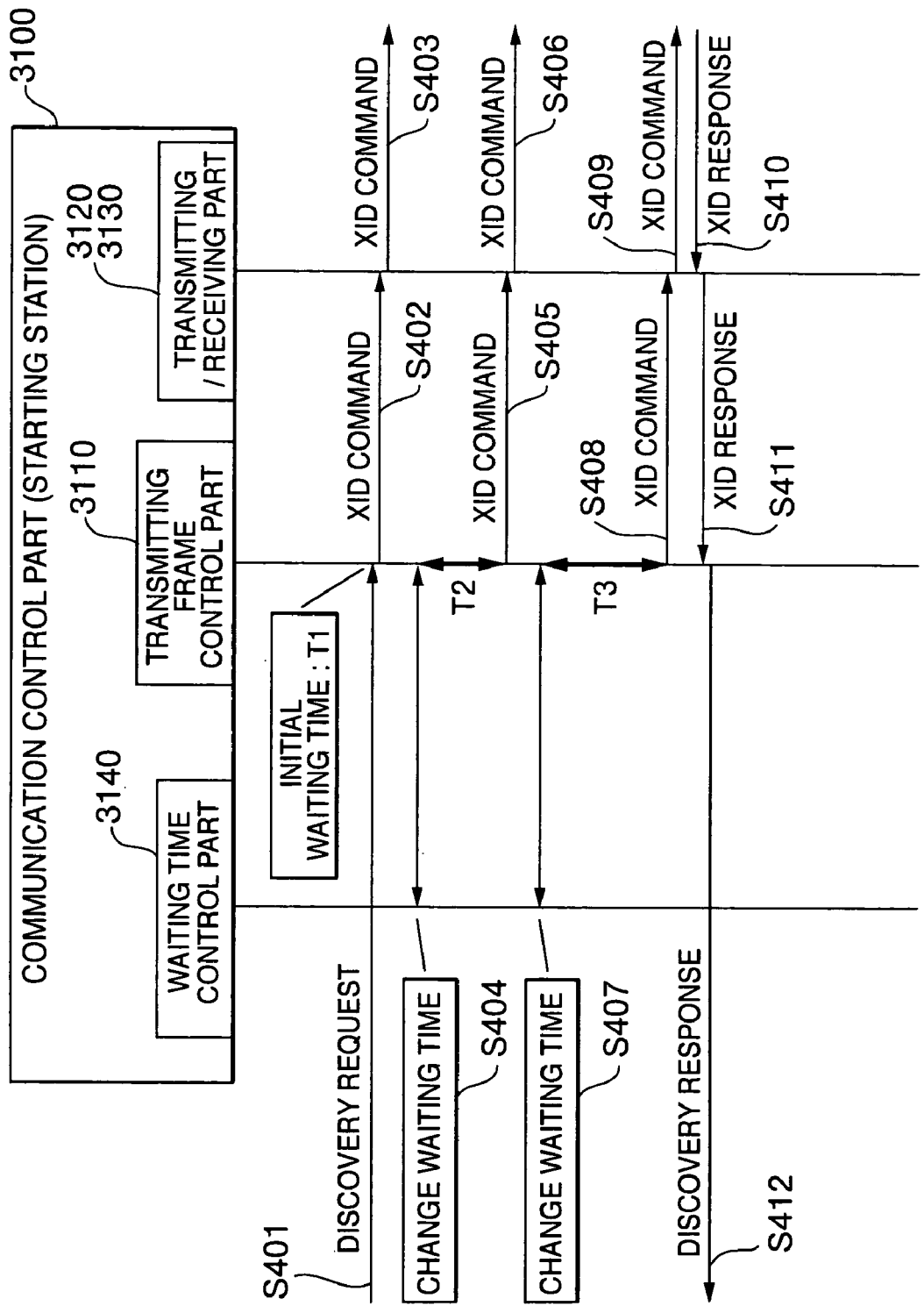

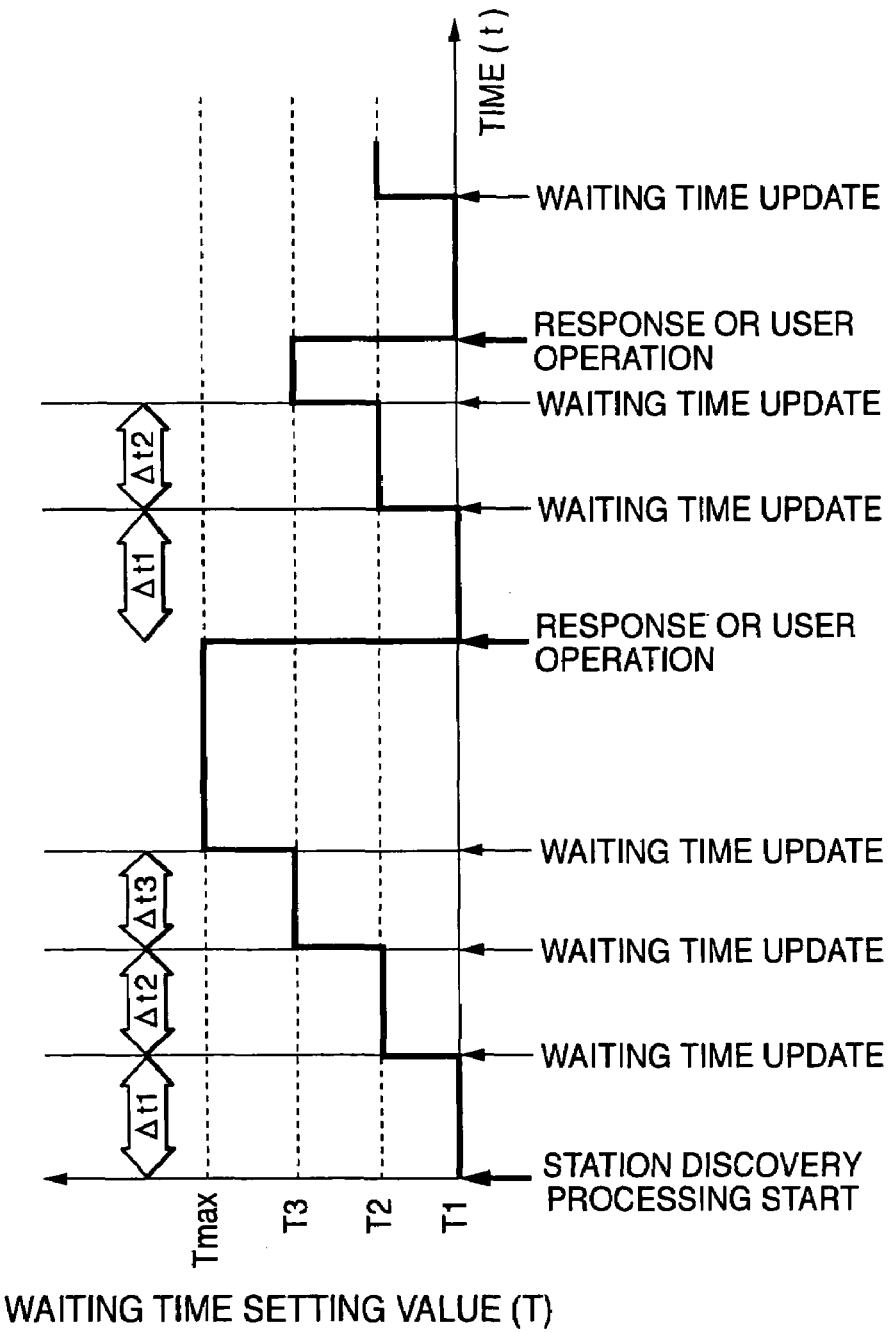

STATION DISCOVERY PROCESSING METHOD AND WIRELESS COMMUNICATION DEVICE

BACKGROUND OF THE INVENTION

1. Field of the Invention

The present invention relates to a station discovery processing method and a wireless communication device for rapidly performing connection processing in a wireless communication system that performs communication in compliance with a wireless communication method (e.g., the standards of infrared communication methods (IrDA: Infrared Data Association)) having a congestion control function.

2. Description of the Prior Art

Generally, communication methods for exchanging data without using cables between different computers and between a computer and peripheral devices include Bluetooth, wireless LAN (IEEE802.11a, IEEE802.11b), non-contact IC wireless communication, and infrared communication methods using infrared rays.

Infrared communication has the advantages that costs and power consumption can be reduced, and devices can be miniaturized. It is used in various apparatuses including a remote control for television. Infrared ports must be made to face each other because infrared rays travel straightly, infrared rays do not pierce through shields such as walls, and the communication distance of infrared communication is short. For these reasons, infrared communication has less possibility to suffer hacking and has higher security than other wireless communications (e.g., wireless LAN IEEE802.11a, IEEE802.11b, etc.). Therefore, a study is being made of use in electronic settlement service.

For example, IrDA standards, which are the standards of infrared communication methods, intend temporary communication among unspecified devices. Therefore, the IrDA standards require, during connection processing, a procedure for controlling the congestion of communication such as a station discovery procedure for detecting devices existing in the range of infrared communication. Data link protocol IrLAP (IrDA Serial Infrared Link Access Protocol) of IrDA defines that infrared data communication consists of processes such as station discovery, connection, data exchange, and disconnection. Moreover, a procedure referred to as media access control is defined to obtain the right of access (transmission right) to the physical layer during station discovery and during connection.

FIG. 1 is a drawing showing the flow of a station discovery procedure based on the conventionally known IrDA standards. FIG. 1 mainly shows the operation of the IrLAP layer and lower layers. As shown in FIG. 1, upon receiving a discovery request (step S501) from an upper layer (IrLMP (IrDA Link Management Protocol), to start infrared communication, a starting station (the side to start communication) performs media monitoring over 500 ms to monitor signals from other devices (step S502). If no signals arrive from other devices, the starting station transmits n (n is the number of slots (1, 6, 8, 16)) pieces of infrared frames called XID (exchange ID) commands (step S503) and then a last XID command (step S504). If no response is obtained from other stations in the meantime, the starting station performs media monitoring again over 500 ms (step S505), and transmits n pieces of XID commands (step S506). If an XID response is obtained from a responding station (the side to receive the communication) in response to the XID commands (step S507), the starting station transmits a last XID command (step S508), and sends a discovery response indicating that a station is discovered, to the upper layer (IrLMP) (step S509). The discovery processing is completed by the above processing, subsequently connection processing is performed, and data exchange becomes possible.

As has been described above, the station discovery procedure in the IrDA standards requires much time. If the number of slots is 6, one second or more is required. For example, if XID command transmission slot interval is 85 ms, and last XID command (46 bytes maximum) transmission time is 48 ms, time required for station discovery processing is 1058 ms (medium monitoring time 500 ms+XID command transmission time (transmission interval) 85 ms×the number of slots 6+last XID command transmission time 48 ms). It is unrealistic to use the station discovery procedure under services requiring high speed.

On the other hand, as a prior art that rapidly performs a station discovery procedure, there is a method which continues transmitting XID commands until a responding station is discovered (e.g., Japanese Published Unexamined Patent Application 2002-204201). FIG. 2 shows the flow of a high speed method of a prior art station discovery procedure described in Japanese Published Unexamined Patent Application 2002-204201. In FIG. 2, upon receiving a discovery request (step S601), a starting station immediately transmits an XID command (step S602). This method continues transmitting the XID command until a response is obtained from a responding station (steps S603 and S604). When an XID response is obtained from a responding station (step S605), the starting station terminates the discovery processing and returns a discovery response to an upper layer (step S606).

However, the aforementioned high speed method of the prior art station discovery procedure has several problems. Since plural responding stations can respond at the same time, when XID responses are returned, collision occurs in the starting station and no XID response may not be obtained.

FIG. 3 shows the flow of a prior art station discovery procedure. Upon starting station discovery, a starting station transmits a discovery request frame (XID command) (step S701). Thereafter, the starting station waits for the reception of data for prescribed time (step S702), and if no data is received, it transmits the discovery request frame again. Upon receiving data, it determines whether the received data is a discovery response frame (XID response) (step S703), and if a discovery response frame, it transmits a last discovery request frame (last XID command) (step S704), and terminates the discovery procedure. If not a discovery response frame, the starting station deletes the received frame, determining that noise invaded, and transmits the discovery request frame again.

As described above, the prior art method generally ignores frames other than discovery response frames received during discovery processing. When XID responses are obtained at the same time from plural responding stations, frames received in a starting station have been destroyed due to a collision. However, in this case, the starting station cannot determine whether the frames have been destroyed because responses have been obtained at the same time from plural responding stations, or noise invaded the frames. As a result, when plural responding stations exist, the starting station cannot discover other stations permanently.

The infrared communication device described in Japanese Published Unexamined Patent Application 2002-204201 starts a station discovery operation without monitoring communication and continues the station discovery operation until the command to stop infrared communication is explicitly given from the user. As a result, the device interferes with discovery processing having been started earlier by another device, and the device having started earlier the discovery processing cannot make connection permanently.

Moreover, since the discovery procedure described in Japanese Published Unexamined Patent Application 2002-204201 continues transmitting XID commands until a response is obtained from a responding station, power consumption increases. If an operator exists in the starting station, an increase in power consumption can be curbed to some extent by the operator explicitly giving the command to stop the infrared communication. However, with automatic terminals in which an operator does not always exist, such as automatic vending machines and unattended shop terminals, power consumption would increase.

The present invention solves the problems of the aforementioned prior art and provides a station discovery processing method and a wireless communication device that enable rapid and sure connection with devices that perform communication in compliance with a wireless communication method (e.g., the standards of infrared communication methods) having a congestion control function.

SUMMARY OF THE INVENTION

A station discovery processing method according to one aspect of the present invention includes the steps of: transmitting a discovery request frame; determining whether data is received, in response to the discovery request frame; if data is received, determining a transmission error of the received data; and if there is a transmission error in the received data, or if no data is received in response to the discovery request frame, deciding a new transmission distance and controlling the transmission power of a transmitting part to power corresponding to the decided transmission distance.

A wireless communication device of the present invention includes: a transmitting part that transmits data to other communication devices; a receiving part that receives data from the other communication devices; a communication frame control part that generates the data to be transmitted from the transmitting part and detects data reception from the receiving part; a frame determining part that determines a frame type and validity of the data received from the receiving part; a transmission distance control part that decides a data transmission distance on the basis of notice from the communication frame control part and the frame determining part; and a power control part that controls transmission power of the data transmitted from the transmitting part so that the data is transmitted to another communication device existing in a position of the transmission distance decided by the transmission distance control part. If there is a transmission error in the data received from the receiving part in response to a discovery request frame transmitted from the transmitting part, or if no data is received from the receiving part, the transmission distance control part decides a new transmission distance, the power control part controls the transmission power of the data to be transmitted, and the transmitting part transmits the discovery request frame again.

According to such a station discovery processing method and a wireless communication device, during station discovery processing, a new transmission distance is decided according to whether data is received in response to a discovery request frame, and the validity of the received data, the transmission power of the transmitting part is controlled to power corresponding to the decided transmission distance, and the transmission distance of the next discovery request frame is changed. Thereby, when plural other communication terminals (hereinafter referred to as responding stations) exist within a communication range and a collision of received data occurs, only a responding station existing within a minimum distance can be discovered. Also during connection processing and data transfer processing after the station discovery processing, by maintaining the transmission power at the time of the station discovery processing, data can be surely sent to the responding station existing within the minimum distance. Since unnecessarily far transmission of data is avoided, meaningless power consumption can be eliminated.

The station discovery processing method of the present invention, in the step of deciding the new transmission distance and controlling the transmission power of the transmitting part, decides a new transmission distance so that if there is a transmission error in the received data, the transmission distance is reduced, and if no data is received, the transmission distance is increased.

In the wireless communication device of the present invention, the transmission distance control part decides the new transmission distance so that if there is the transmission error in the data received by the receiving part in response to the discovery request frame transmitted from the transmitting part, the transmission distance is reduced, and if no data is received from the receiving part, the transmission distance is increased.

According to such a station discovery processing method and a wireless communication device, if there is a transmission error in received data, that is, a collision of response data occurs, a transmission distance is reduced determining that plural responding stations exist within the communication distance, and if no response data is received, a transmission distance is increased determining that no responding station exists within the transmission distance. By repeating the above operations to change transmission distances depending on whether a responding station exists, one responding station within a minimum distance can be discovered without fail.

The station discovery processing method of the present invention further includes the steps of: determining whether data received in response to the transmission of the discovery request frame is a discovery request frame from another communication device; and if it is the discovery request frame from the other communication device, immediately transmitting a discovery response frame to the other communication device.

In the wireless communication device of the present invention, the frame determining part determines the frame type of the data received from the receiving part, and if the frame type of the received data is the discovery request frame from the other communication device, the communication frame control part generates the discovery response frame and the transmitting part immediately transmits the discovery response frame to the another communication device.

According to such a station discovery processing method and a wireless communication device, even if the wireless communication device of the present invention that performs station discovery processing performs station discovery processing when other communication devices are performing the station discovery processing, upon receiving a discovery request frame from another communication device, the wireless communication device of the present invention immediately returns a discovery response frame and switches control to a responding station. Thereby, without interfering with the discovery processing of the communication device that started earlier the station discovery processing, with the communication device as a starting station, connection can be made rapidly.

The station discovery processing method of the present invention includes the steps of: determining whether data is received for specified waiting time; if no data is received for the waiting time, transmitting a discovery request frame; determining whether data is received in response to the transmission of the discovery request frame; if data is received in response to the transmission of the discovery request frame, determining whether the data is a discovery response frame; and updating the waiting time if it is not a discovery response frame, or no data is received in response to the transmission of the discovery request frame.

A wireless communication device of the present invention includes: a transmitting part that transmits data to other communication devices; a receiving part that receives data from the other communication devices; a communication frame control part that generates the data to be transmitted from the transmitting part, transmits the generated data to the transmitting part after waiting for specified waiting time, and detects data reception from the receiving part; and a waiting time control part that decides waiting time before a discovery request frame is transmitted, on the basis of notice from the communication frame control part. If no data is received from the receiving part in response to a discovery request frame transmitted from the transmitting part, the waiting time control part decides new waiting time and the transmitting part transmits the discovery request frame again after waiting for the new waiting time.

According to such a station discovery processing method and a wireless communication device, during station discovery processing, by changing waiting time before a next discovery request frame is transmitted, depending on whether data is received in response to a discovery request frame, if other communication devices exist, discovery processing is repeatedly performed at short intervals, and if no other communication apparatuses appear for given time, discovery processing is performed at long intervals, so that meaningless power consumption can be eliminated.

The station discovery processing method of the present invention, in the step of updating waiting time, if no response is obtained for a specified period of time in response to a discovery request frame, extends waiting time, and if a response is obtained in response to the discovery request frame, initializes waiting time.

In the wireless communication device of the present invention, the waiting time control part decides the new waiting time so that if no data is received from the receiving part in response to the discovery request frame transmitted from the transmitting part, the waiting time is extended, and if a response is obtained from the receiving part in response to the discovery request frame, the waiting time is initialized.

According to such a station discovery processing method and a wireless communication device, if no responding terminal appears for a specified period of time in response to a discovery request, waiting time is extended to perform discovery processing at long intervals, so that power consumption can be curbed. If a responding terminal appears, waiting time is initialized to switch to rapid discovery processing.

The station discovery processing method of the present invention includes the steps of: if data is received within waiting time, or the received data is not a discovery response frame, determining whether the received data is a discovery request frame from another communication device; if the received data is the discovery request frame from the other communication device, immediately transmitting a discovery response frame to the other communication device.

In the wireless communication device of the present invention, the communication frame control part determines a frame type of the data received from the receiving part, and if the frame type of the received data is a discovery request frame from another communication device, generates a discovery response frame, and the transmitting part immediately transmits the discovery response frame to the other communication device.

According to such a station discovery processing method and a wireless communication device, when a discovery request frame is received from another communication device during a waiting time period, a discovery response frame is immediately returned to switch to a responding station. Thereby, even if a long waiting time period is set, the responding station can respond immediately to the other communication device performing discovery processing.

As has been described in detail, according to the station discovery processing method and the wireless communication device of the present invention, by controlling the transmission power of a starting station, a collision of responses during discovery processing can be avoided. Thereby, a wireless communication terminal existing in a minimum distance can be discovered without fail. According to the present invention, by controlling waiting time during discovery processing in a starting station, a trade-off between speed and power saving can be automatically decided depending on the existence or absence of responding stations. In other words, switching can be automatically performed so that if other wireless communication terminals appear continuously, rapid discovery processing takes precedence, and if other wireless communication terminals appear infrequently, power saving takes precedence.

The station discovery processing method and the wireless communication device of the present invention can apply to store terminals providing electronic settlement service by which the electronic data of credit cards and debit cards, and electronic values such as electronic money and electronic tickets that are stored in users' portable terminals are received from the store terminals over wireless communication.

When a prior art wireless communication device that performs high speed station discovery processing is installed in a store terminal, if two or more user portable terminals exist within the communication range of the store terminal, two or more portable terminals return responses at the same time in response to a connection request, causing permanent failure in connection. However, if a wireless communication device of the present invention that performs station discovery processing is installed in a store terminal, even if two or more user portable terminals exist in the communication range of the store terminal, the portable terminal of a nearest user or the user to make settlement now can be automatically discovered.

The prior art, to enable sure connections at all times, has required special limitations on user queue forms such as, for example, a sufficient distance required between the user to make settlement now and users queued to make settlement next. However, by applying the station discovery processing method of the present invention, without special limitations having been provided so far, a store terminal can discover the portable terminal of the user to make settlement now.

If the wireless communication device of the present invention is applied to terminals in which operators are absent, such as automatic vending machines, self-service gas stations, ATMs, and the like, when users appear frequently, settlement processing is rapidly performed by rapid discovery processing, while when users appear infrequently, power consumption can be curbed by automatically extending waiting time.

If the station discovery processing method or the wireless communication device of the present invention is applied to portable terminals, since the portable terminals of users can be detected, the appearances of users can be detected without

BRIEF DESCRIPTION OF THE DRAWINGS

FIG. 6 is a data structural drawing showing the format of a frame received by the frame determining part of a starting station during discovery processing in infrared communication;

FIG. 11 is a drawing showing a communication sequence during station discovery processing in the infrared communication device according to the second embodiment of the present invention; and FIG. 12 is a characteristic drawing showing the correlation between waiting time setting values and processing time in the infrared communication device according to a second embodiment of the present invention.

DESCRIPTION OF THE PREFERRED EMBODIMENTS

Hereinafter, embodiments of the present invention will be described with reference to the accompanying drawings. The present invention is not limited to these embodiments, and may be implemented in various ways without departing from the spirit and scope of the invention.

First Embodiment

Figure 1:
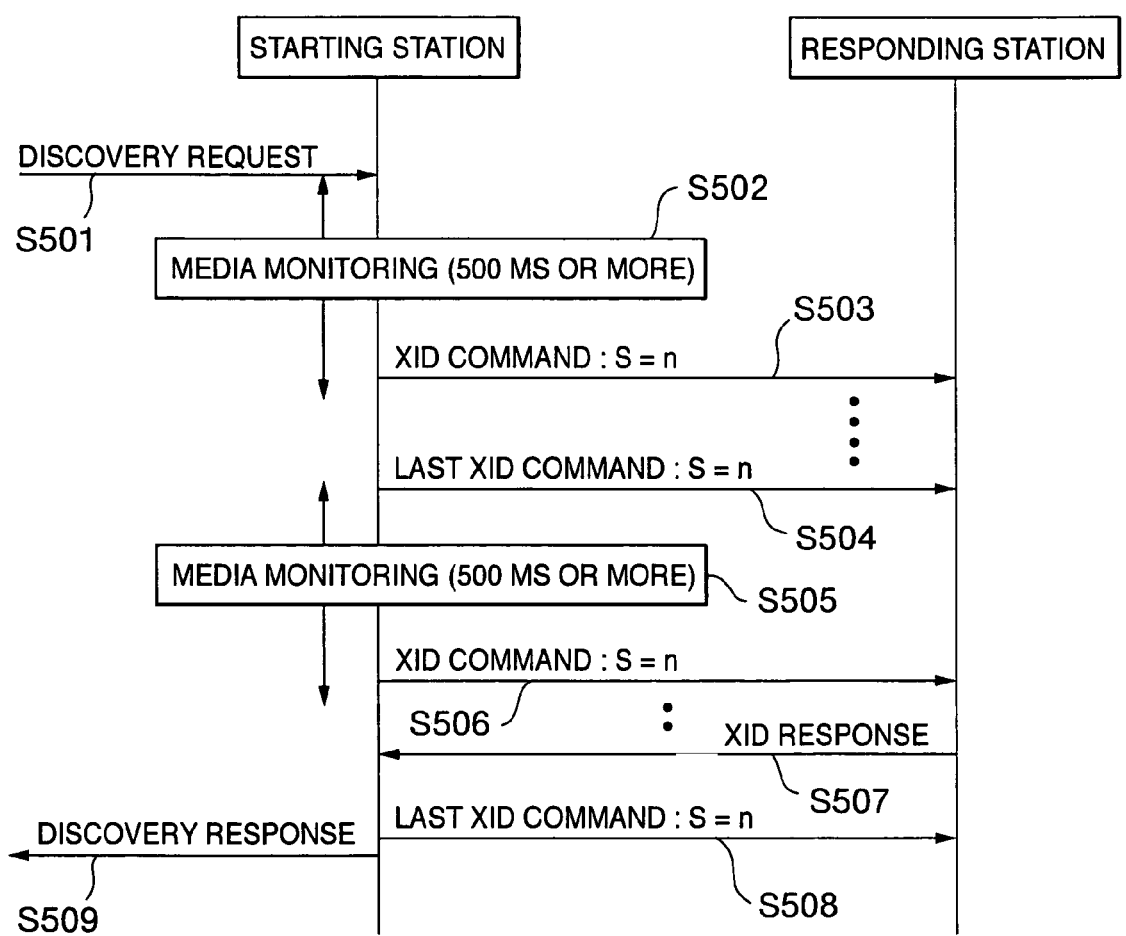
FIG. 1 is a communication sequence drawing during station discovery processing in compliance with the infrared communication standards (IrDA)
Figure 2:
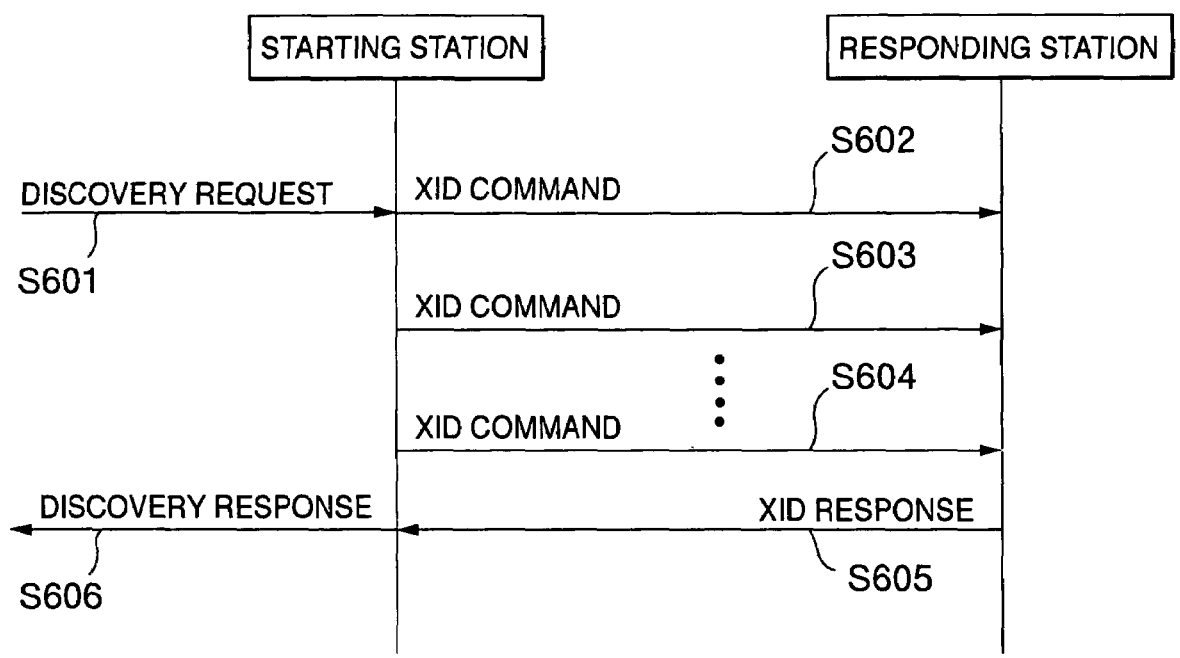
FIG. 2 is a drawing showing a communication sequence during station discovery processing in prior art infrared communication.
Figure 3:
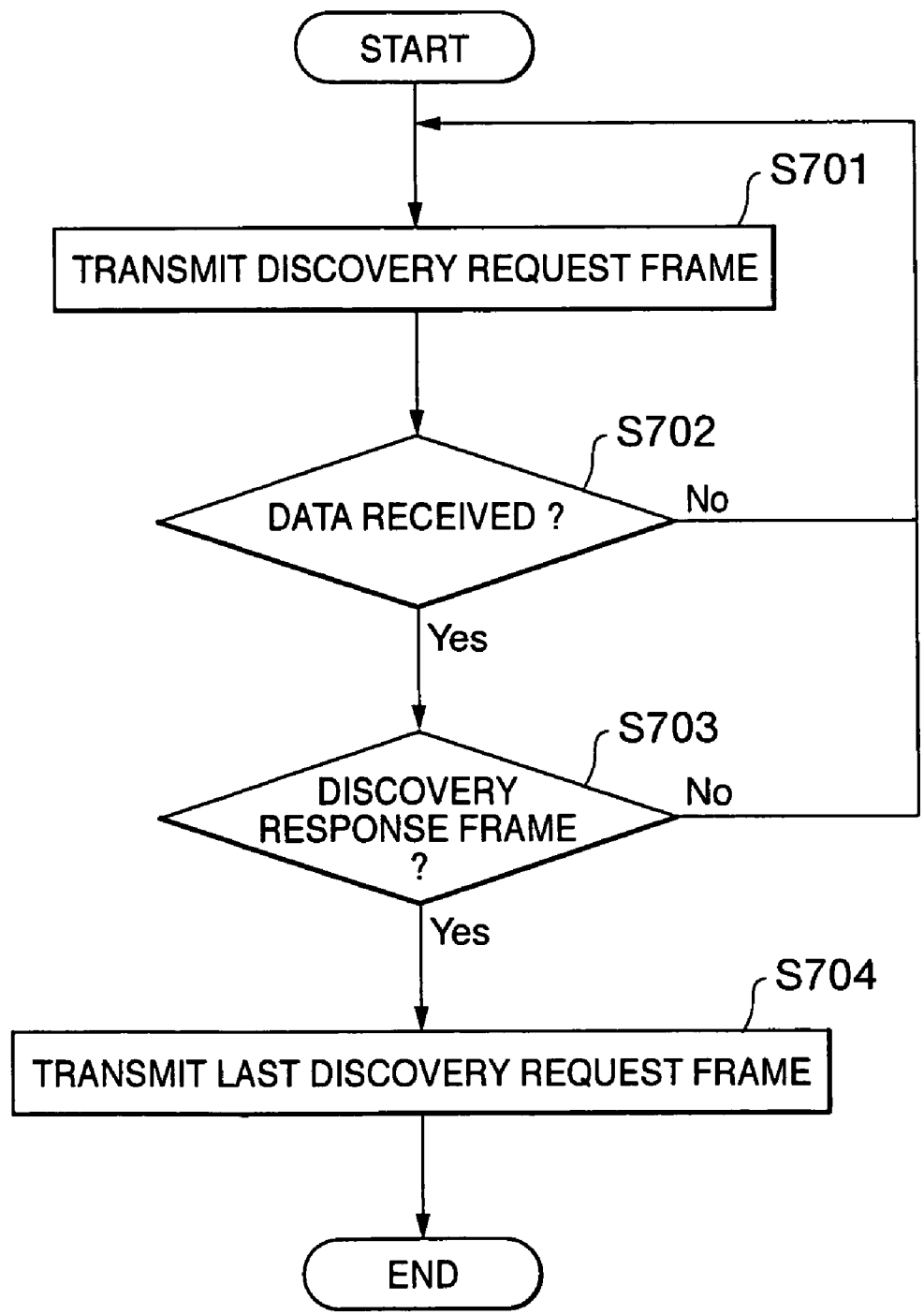
FIG. 3 is a flowchart showing the flow of station discovery processing in the prior art infrared communication.
Figure 4:
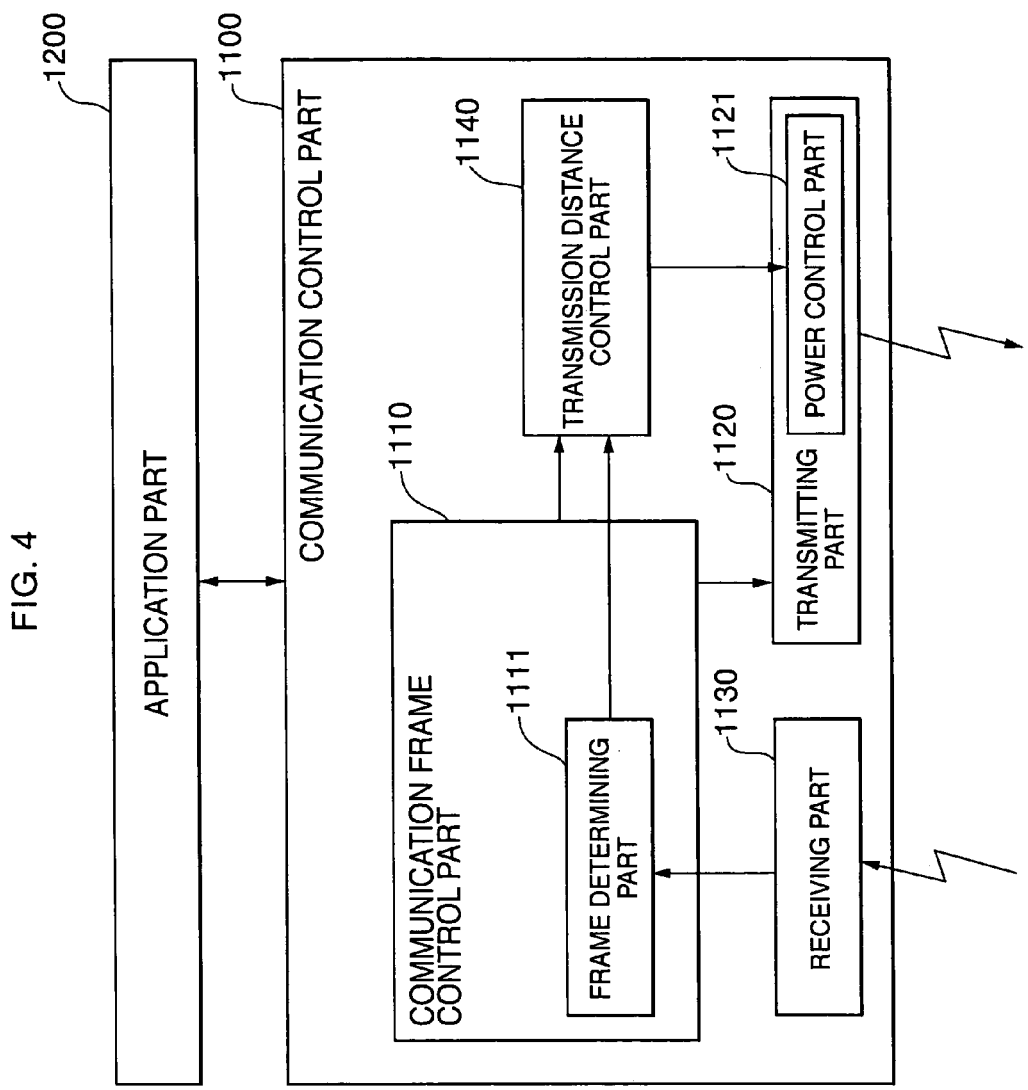
FIG. 4 is a block diagram showing the configuration of an infrared communication device according to a first embodiment of the present invention.

FIG. 4 is a block diagram showing the configuration of an infrared communication device according to a first embodiment of the present invention. The infrared communication device includes a communication control part 1100 and an application part 1200. The communication control part 1100 includes a communication frame control part 1110, a transmitting part 1120, a receiving part 1130, and a transmission distance control part 1140. The communication frame control part 1110 includes a frame determining part 1111, and the transmitting part 1120 includes a power control part 1121. The application part 1200, which is an application part using infrared communication, generates a data transmission request and other requests to the communication control part 1100.

The communication control part 1100, which is a part corresponding to a communication protocol, upon receiving requests from the application part 1200, performs processing for discovery of other communication devices, performs processing for connection with other communication devices, and transmits and receives data to and from the other communication devices. The communication control part 1100, according to requests from the application part 1200, transmits data to other communication devices and sends data received from other communication devices to the application part 1200.

During transmitting, the communication frame control part 1110 generates a communication frame necessary for the transmission, and during receiving, determines the validity and type of a received communication frame in the frame determination part 1111. The transmission distance control part 1140 performs the control of data transmission distance L upon receiving a determination result from the frame determining part 1111 and a control command from the communication control part 1100. The transmitting part 1120 transmits the communication frame generated in the communication frame control part 1110. The power control part 1121, upon receiving a control command from the transmission distance control part 1140, controls transmission power so that data is transmitted to another communication device at a distance of L from the infrared communication device. The receiving part 1130 receives communication frames transmitted from other communication devices and sends them to the frame determining part 1111 of the communication frame control part 1110. The receiving part 1130 may include a receive sensitivity control part, which receives control commands from the transmission distance control part 1140 and controls receive sensitivity.

Figure 5:
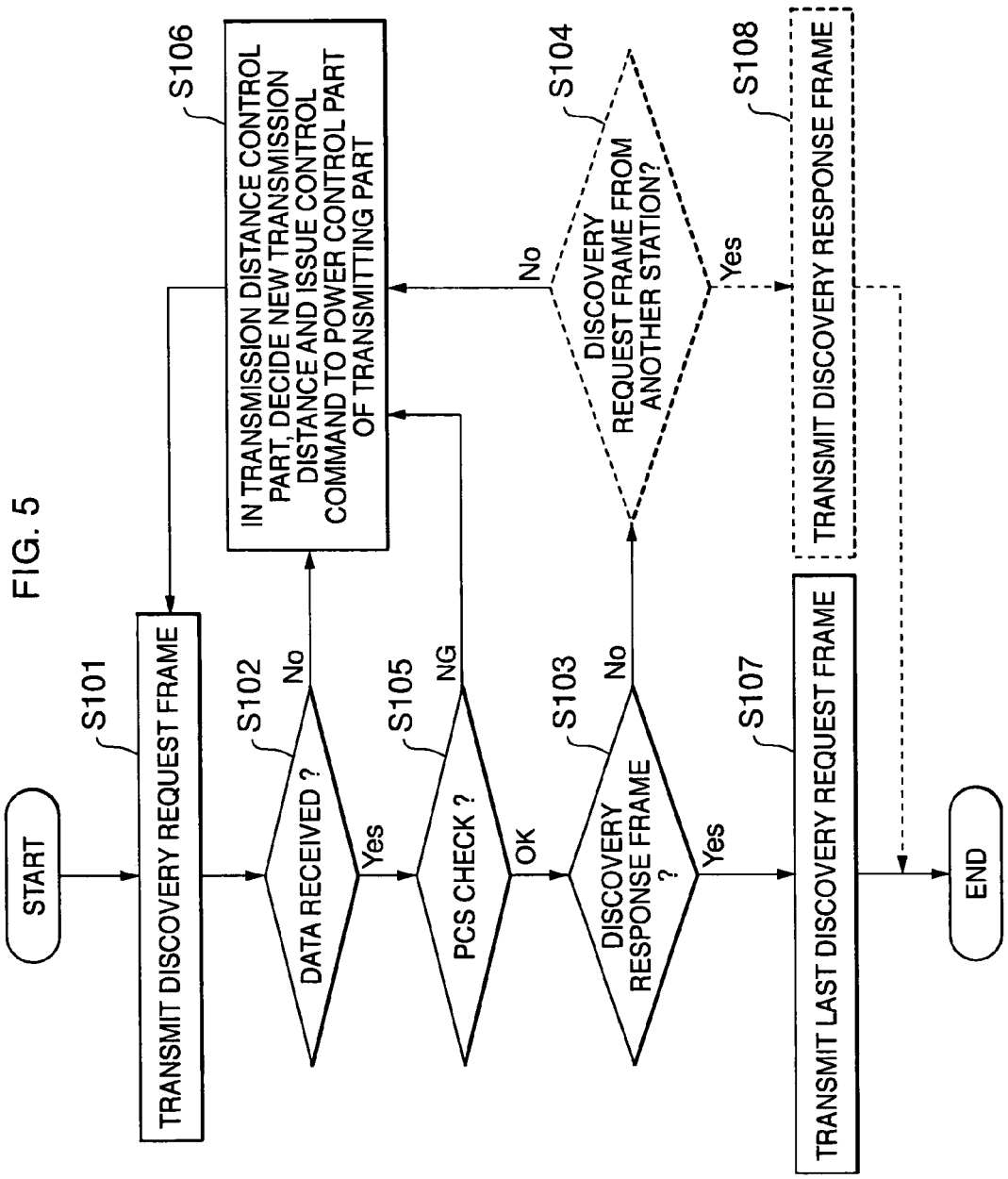
FIG. 5 is a flowchart showing the flow of station discovery processing in the infrared communication device according to the first embodiment of the present invention.

Next, referring to FIG. 5, a description is made of the flow of station discovery processing in the first embodiment. FIG. 5 is a drawing showing the flow of processing after a discovery request is received in the communication frame control part 1110 until the discovery processing terminates. Here, a method of controlling transmission power is described.

The communication frame control part 1110 starts discovery processing upon receiving a discovery request, generates a discovery request frame, and transmits it from the transmitting part 1120 (step S101). The receiving part 1130 determines whether data is received from other communication devices, in response to the transmitted data (step S102). Upon receiving data, the receiving part 1130 sends the received data to the communication frame control part 1110, and the frame determining part 1111 checks FCS (step S105). FCS is a frame check sequence used to check the validity of frame transmission in the receiving end.

The format of a frame received in the frame determining part 1111 during discovery processing is shown in FIG. 6. The frame consists of BOF (Begin of Frame: a start flag indicating the start of the frame), address field (the address of a communication party or connection plus command/response identification bit. The address of the communication party during the discovery processing is 1111111B), control field (defines the function of the frame), information field (used for the transmission of information message), FCS, and EOF (End of Frame: end flag indicating the termination of the frame). FCS is computed from the address field, control field, and information field by use of a generator polynomial (CRC) and added in the transmitting end. A data error during transmission can be detected by computing FCS in the same way in the receiving end.

If there is no data error as a result of the FCS check, the frame determining part 1111 determines whether or not the received frame is a discovery response frame (step S103). If it is a discovery response frame, a last discovery request frame is generated in the communication frame control part 1110 and transmitted from the transmitting part 1120 (step S107), and the station discovery processing terminates. If it is determined in the frame determining part 1111 that the received frame is not a discovery response frame, the frame determining part 1111 determines whether it is a discovery request frame from another communication device, that is, another station (step S104). If it is a discovery request frame from another station, a discovery response frame is transmitted immediately to the station (step S108), the discovery processing is terminated, and the operation is switched to the responding station from the starting station.

If no data is received (step S102), if it is detected in the FCS check that the received frame has been destroyed (step S105), or if the received frame is neither a discovery response frame nor a discovery request frame from another station (step S103, step S104), the frame determining part 1111 or the communication frame control part 1110 sends an undefined frame receive notice and data-not-received notice to the transmission distance control part 1140, which decides a new transmission distance and sends a command for controlling transmission power to the power control part 1121 of the transmitting part 1120 (step S106). The communication frame control part 1110 transmits a discovery request frame again (step S101) to repeat the discovery processing.

When data-not-received notice is sent to the transmission distance control part 1140 from the communication frame control part 1110, or undefined frame receive notice is sent to the transmission distance control part 1140 from the frame determining part 1111, the data-not-received notice or the undefined frame receive notice may be sent after generating a last discovery request frame in the communication frame control part 1110 and transmitting it from the transmitting part 1120.

Of the flow of the above processing, the processing (step S104) that the frame determining part 1111 determines whether a received frame is a discovery request frame from another station may be omitted if the operation of a device performing station discovery processing in the first embodiment is limited to the operation as a starting station, in other words, the device does not need to receive discovery requests from other devices. Likewise, the processing (step S108) that transmits a discovery response frame may be omitted. In that case, when received data is not a discovery response frame (step S103), the processing (step S106) that controls distance is immediately performed.

The processing (step S103) that the frame determining part 1111 determines whether or not a received frame is a discovery response frame, and the processing (step S104) that determines whether or not the frame is a discovery request frame from another station may be performed at the same time. The order of the processing may be changed.

In the above processing, in the case where a frame error is detected in the FCS check, the following may have occurred; XID responses are causing a collision because plural responding stations exist within a communication range, or a frame has been destroyed because of invasion of noise. In these cases, since a receiving end can detect that the frame has been destroyed, but cannot determine what occurs, it deletes the received frame, regarding as noise receive. As a result, noise receive occurs whenever plural responding stations exist, and no responding station can be discovered so long as plural responding stations exist.

On the other hand, in the first embodiment, when a frame error is detected, the frame determining part 1111 issues a command for reducing a transmission distance to the transmission distance control part 1140, and the power control part 1121 changes transmission power to the one corresponding to a specified transmission distance, whereby the communication range of the starting station is narrowed so that only a responding station nearest to the starting station can be discovered.

If there is no response to the discovery request frame, the communication frame control part 1110 issues a command for increasing a transmission distance to the transmission distance control part 1140, and the power control part 1121 changes transmission power to the one corresponding to a specified transmission distance, whereby the communication range of the starting station is widened so that a responding station nearest to the starting station can be discovered.

Next, an example of a distance control algorithm for controlling communication distances in the transmission distance control part 1140 is shown below.

1. The values of Lmin (data transmission minimum distance), Lmax (data transmission maximum distance), L1 (initial data transmission distance) are initialized (Lmin≦L1≦Lmax), and discovery processing is started with L (transmission distance) equal to L1.
2. The following update processing is performed according to response data.
    When an undefined frame (except discovery response frames and discovery request frames) is received, the value of Lmax is updated to L.
    When no data is received, the value of Lmin is updated to L.
3. A new transmission distance L is calculated by L=(Lmin+Lmax)/2, and discovery processing is continued.
4. Until a discovery response frame or discovery request frame is received, the above operations are repeated.

The above algorithm assumes that the initial values of Lmin and Lmax are stored in the transmission distance control part 1140. The initial value of L1 (initial data transmission distance) may be stored in the transmission distance control part 1140, and the value of L when a discovery response frame is received in previous discovery processing may be saved as a next initial value. The average of several previous values of L when discovery response frames of discovery processing were received may be saved as an initial value.

Figure 7:
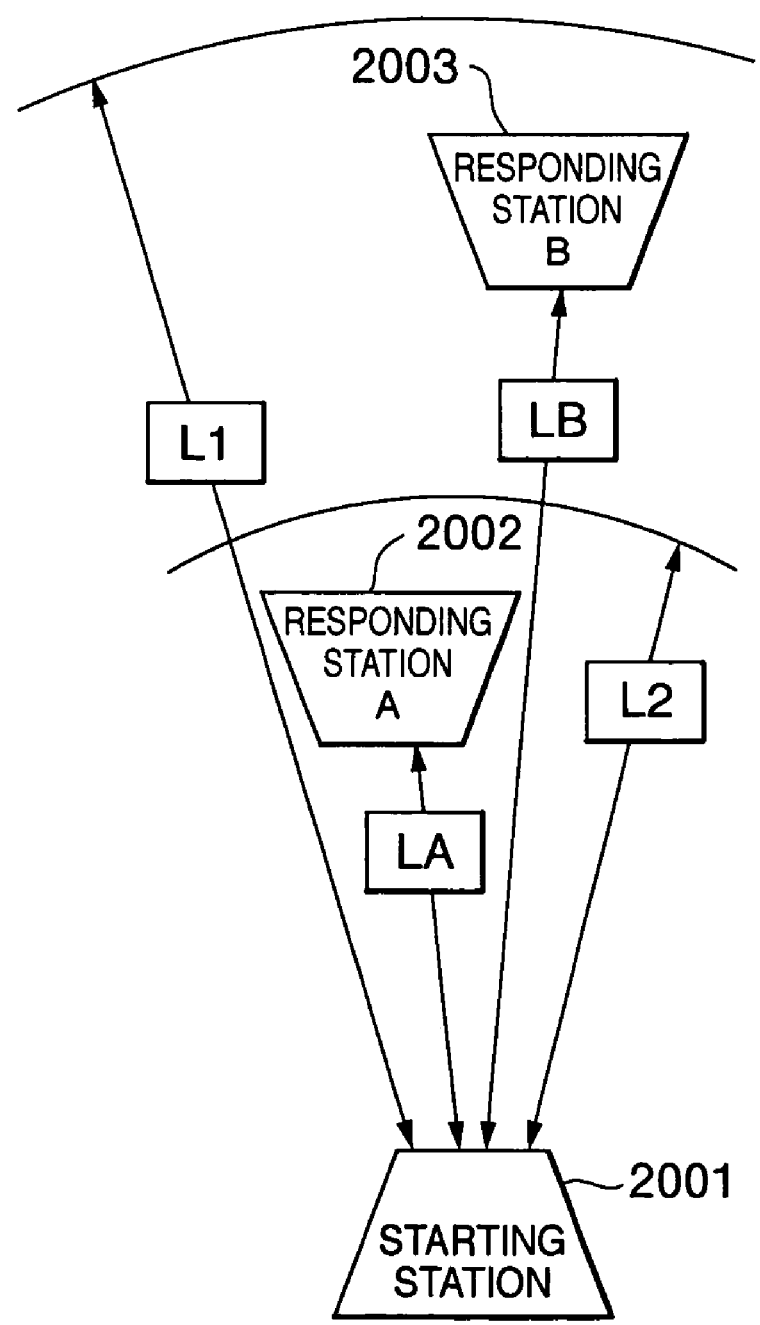
FIG. 7 is a schematic diagram showing a positional relationship between a starting station and plural responding stations when station discovery processing is performed in the infrared communication device according to the first embodiment of the present invention.
Figure 8:
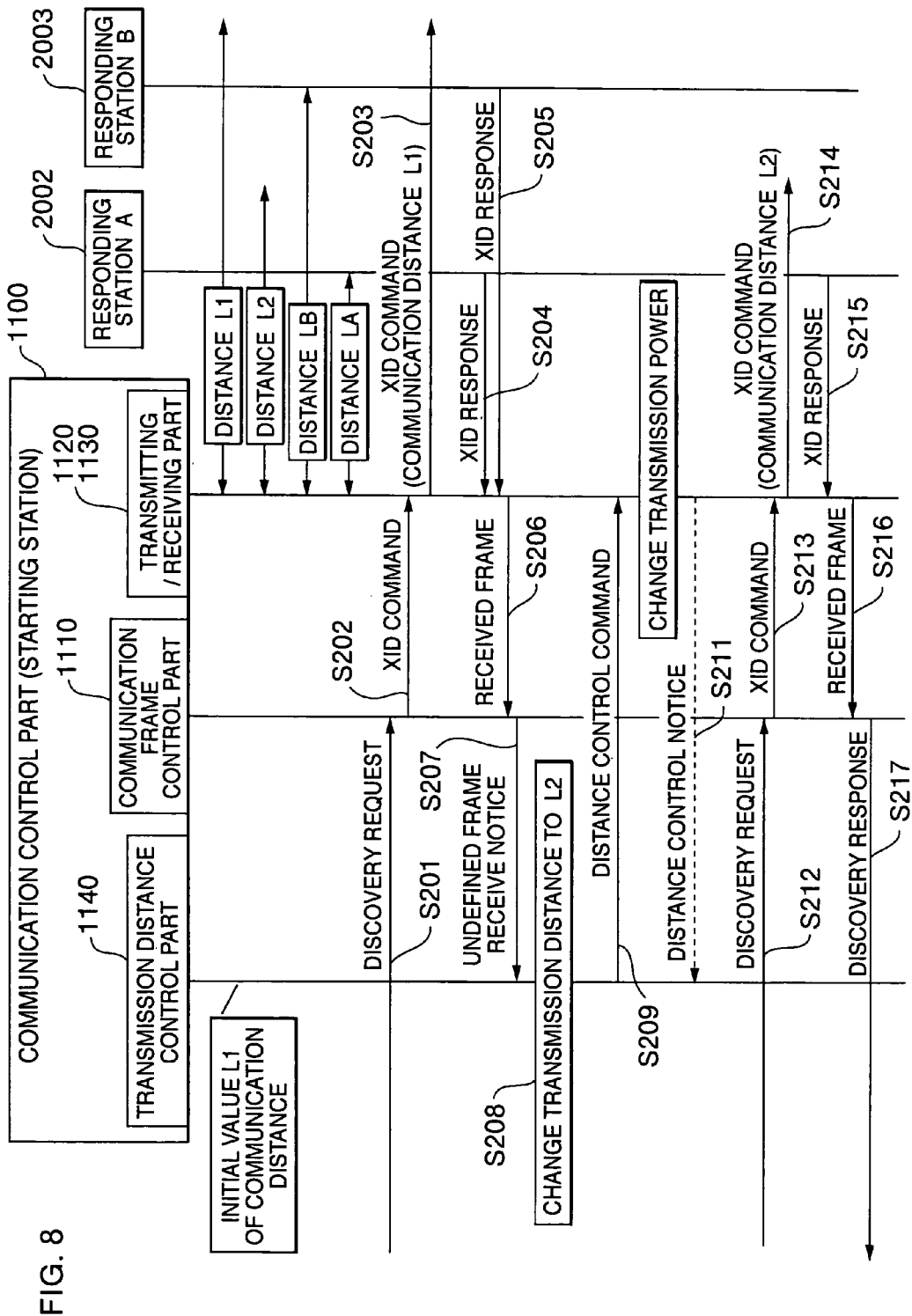
FIG. 8 is a drawing showing a communication sequence during station discovery processing in an infrared communication device according to the first embodiment of the present invention.

FIG. 8 shows an example of a communication sequence between a starting station and responding stations in station discovery processing of the first embodiment. FIG. 7 shows the positional relationship between the starting station and plural responding stations during execution of the sequence example of FIG. 8. In FIG. 7, the initial communication distance of a starting station 2001 is L1. Two responding stations A2002 and B2003 exist within the communication range of the starting station. The distance between the starting station 2001 and the responding station A2002 is LA, and the distance between the starting station 2001 and the responding station B2003 is LB.

Next, a communication sequence is described in detail with reference to FIG. 8. When the communication control part 1100 of a starting station starts station discovery processing, a discovery request is sent to the communication frame control part 1110 (step S201). The communication frame control part 1110 generates an XID command frame and sends it to the transmitting part 1120 (step S202). The transmitting part 1120 transmits the XID command frame with initial transmission power (step S203). The initial transmission power is set according to the value of the transmission distance (L1) set in the transmission distance control part 1140 of the communication control part 1100. The receiving part 1130 of the starting station receives XID response frames from responding stations A and B existing within transmission distance L1 (initial data transmission distance) (steps S204 and S205). The receiving part 1130 sends the received frames to the communication frame control part 1110 (step S206). The communication frame control part 1110 analyzes the contents of the frames in the frame determining part 1111.

If XID response frames are received simultaneously from plural responding stations, a frame error is detected in the FCS check in the frame determining part 1111. In this case, since the structure of the frames have been destroyed, the frame determining part 1111 cannot determine which frame it has received. Therefore, the frame determining part 1111 sends undefined frame receive notice to the transmission distance control part 1140 (step S207). The transmission distance control part 1140 sets a new transmission distance L2 (step S208) and sends a distance control command to the power control part 1121 of the transmitting part 1120 (step S209). The power control part 1121 changes the transmission power (step S210), and returns distance control notice to the transmission distance control part 1140 (step S211). Upon receiving the distance control notice, the transmission distance control part 1140 sends a discovery request to the communication frame control part 1110 (step S212).

Of the above communication sequence, the distance control notice (step S211) may be omitted so that after the distance control command (step S209) is sent from the transmission distance control part 1140, a discovery request is transmitted at appropriate timing (step S212).

Upon receiving the discovery request, the communication frame control part 1110 generates an XID command frame again and sends it to the transmitting part 1120 (step S213). The transmitting part 1120 transmits the XID command frame with the initial transmission power (step S214). Since the transmission power at this time is set to transmit transmission frames by about a distance L2, the receiving part 1130 of the starting station receives an XID response frame only from the responding station A2002 existing within the distance L2 (step S215). The receiving part 1130 sends the received frame to the communication frame control part 1110 (step S216). The communication frame control part 1110 analyzes the contents of the frame in the frame determining part 1111, upon determining that it is an XID response, sends a discovery response to the communication control part 1110, and terminates the discovery processing.

In this way, according to the first embodiment, even in the case where a collision of XID responses has occurred because plural responding stations exist in the communication distance of the starting station, by reducing a transmission distance in the transmission distance control part 1140 and the power control part 1121, only a responding station existing within a minimum distance can be discovered.

If no responding station exists within the communication distance, by extending the transmission distance in the transmission distance control part 1140 and the power control part 1121, likewise, it becomes possible to discover the responding station existing in a minimum distance.

Furthermore, by maintaining the transmission power at the time when a responding station has been discovered until the communication is disconnected, and performing connection processing and data transfer processing with the transmission power at the time when the responding station has been discovered, data can be sent to a responding station existing within a minimum distance without fail. Since unnecessarily far transmission of data is avoided, meaningless power consumption can be eliminated.

The receiving part 1130 may further include a receive sensitivity control part so that the transmission distance control part 1140 sends a control command for lowering receive sensitivity to the receive sensitivity control part upon receiving undefined frame receive notice, and sends a control command for raising receive sensitivity to the receive sensitivity control part upon receiving data-not-received notice.

In this way, according to the first embodiment, a collision of XID responses occurring during an attempt to rapidly discover devices complying with the IrDA standards can be avoided, and a communication party existing within a minimum distance can be discovered rapidly and without fail.

Although the infrared communication device in the first embodiment has an optimal configuration for solving the problems of the prior art, it can be physically realized in various ways. For example, it may be realized as driver software of infrared communication I/F of personal computers, or the respective functions of the components of the infrared communication device may be combined in proper units into hardware modules so that the infrared communication device is realized by combining the hardware modules.

In the case of driver software of personal computer, for example, the function of the aforementioned communication control part 1100 is realized as software executed by the CPU of the personal computer. For realization by hardware, the hardware modules may be realized by wired logics or a microcomputer. For realization by a microcomputer, for example, the functions of the communication frame control part 1110 and the transmission distance control part 1140 described above are realized by software such as microcodes executed by the microcomputer.

According to the above description, upon receiving a determination result in the frame determining part 1111 and a control command from the communication control part 1100, the transmission distance control part 1140 decides data transmission distance L, and upon receiving a control command from the transmission distance control part 1140, the power control part 1121 controls transmission power so that data is transmitted to other communication devices at a distance of the transmission distance L. However, instead of explicitly deciding the transmission distance L, the transmission distance control part 1140 may control the power control part 1121 on the basis of a predetermined control logic so that transmission power is consequently controlled by the power control part 1121 in the same way.

The configuration and operation of an infrared communication device to which the present invention is applied have been described in detail. The present invention can also apply to other types of wireless communication devices that perform station discovery processing.

Second Embodiment

Figure 9:
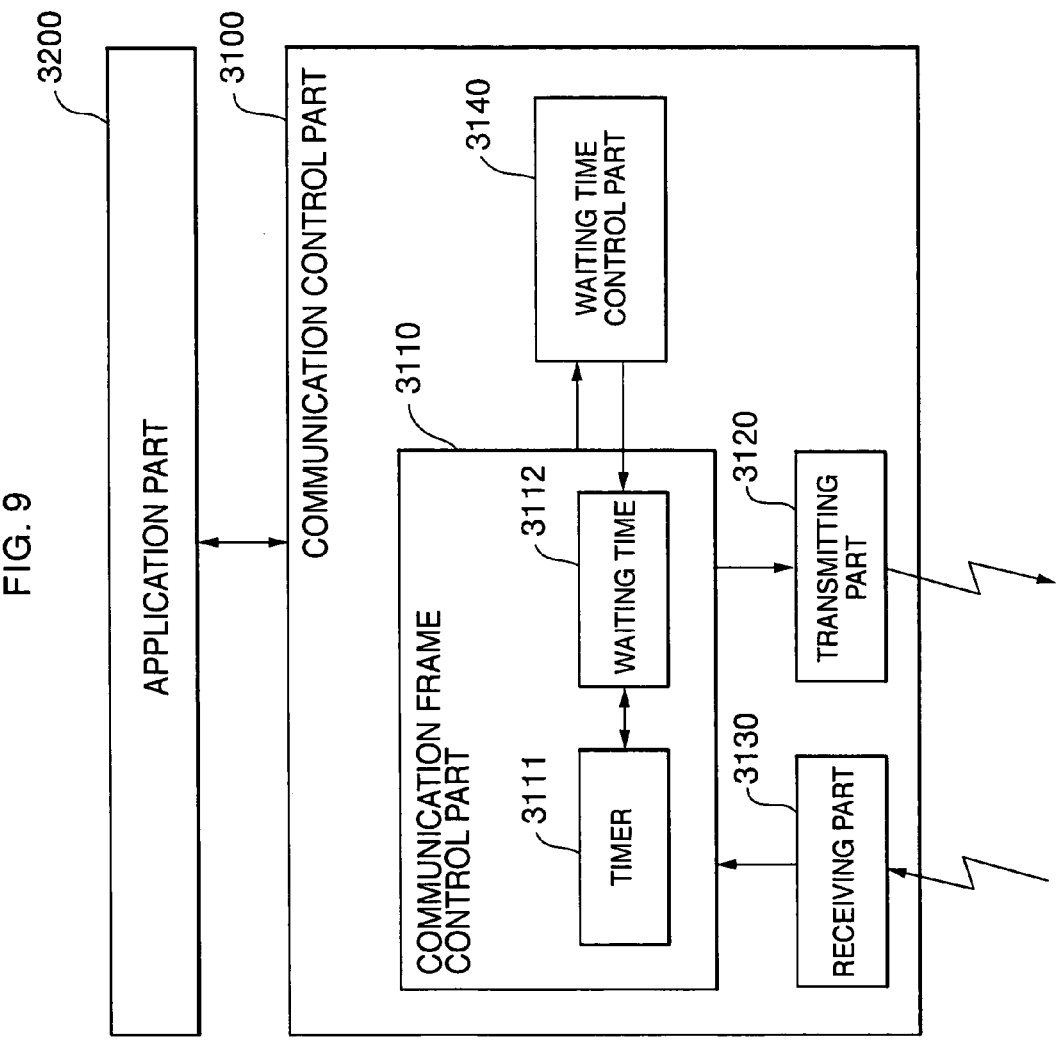
FIG. 9 is a block diagram showing the configuration of an infrared communication device according to a second embodiment of the present invention.

An infrared communication device and a communication method in a second embodiment of the present invention places emphasis on speed when an automatic vending machine and an unattended terminal are being used by many users, and reduces power consumption when they are being used by a small number of users. FIG. 9 is a block diagram showing the configuration of an infrared communication device according to a second embodiment of the present invention. The infrared communication device includes a communication control part 3100 and an application part 3200. The communication control part 3100 includes a communication frame control part 3110, a transmitting part 3120, a receiving part 3130, and a waiting time control part 3140. The application part 3200, which is an application part using infrared communication, generates a data transmission request and other requests to the communication control part 3100.

The communication control part 3100, which is a part corresponding to a communication protocol, upon receiving a request from the application part 3200, performs processing for discovery of other communication devices, performs processing for connection with other communication devices, and transmits and receives data to and from the other communication devices. The communication control part 3100 transmits data to other communication devices according to requests from the application part 3200, and sends data received from other communication devices to the application part 3200.

The communication frame control part 3110, upon receiving a control command from the communication control part 3100, generates a communication frame necessary for transmission, and determines the validity and type of a received communication frame. The communication frame control part 3100 has an internal timer 3111 and holds the value of waiting time (T) 3112. The communication frame control part 3110, upon receiving a station discovery processing request from the communication control part 3100, waits for the waiting time (T) by use of the timer 3111 before sending a station discovery request frame to the transmitting part 3120. Upon receiving a control command from the communication frame control part 3110, the waiting time control part 3140 changes a waiting time setting value 3112 within the communication frame control part 3110. The waiting time control part 3140 may exist within the communication frame control part 3110. The transmitting part 3120 transmits a communication frame generated in the communication frame control part 3110. The receiving part 3130 receives a communication frame transmitted from another communication device and sends it to the communication frame control part 3110.

Figure 10:
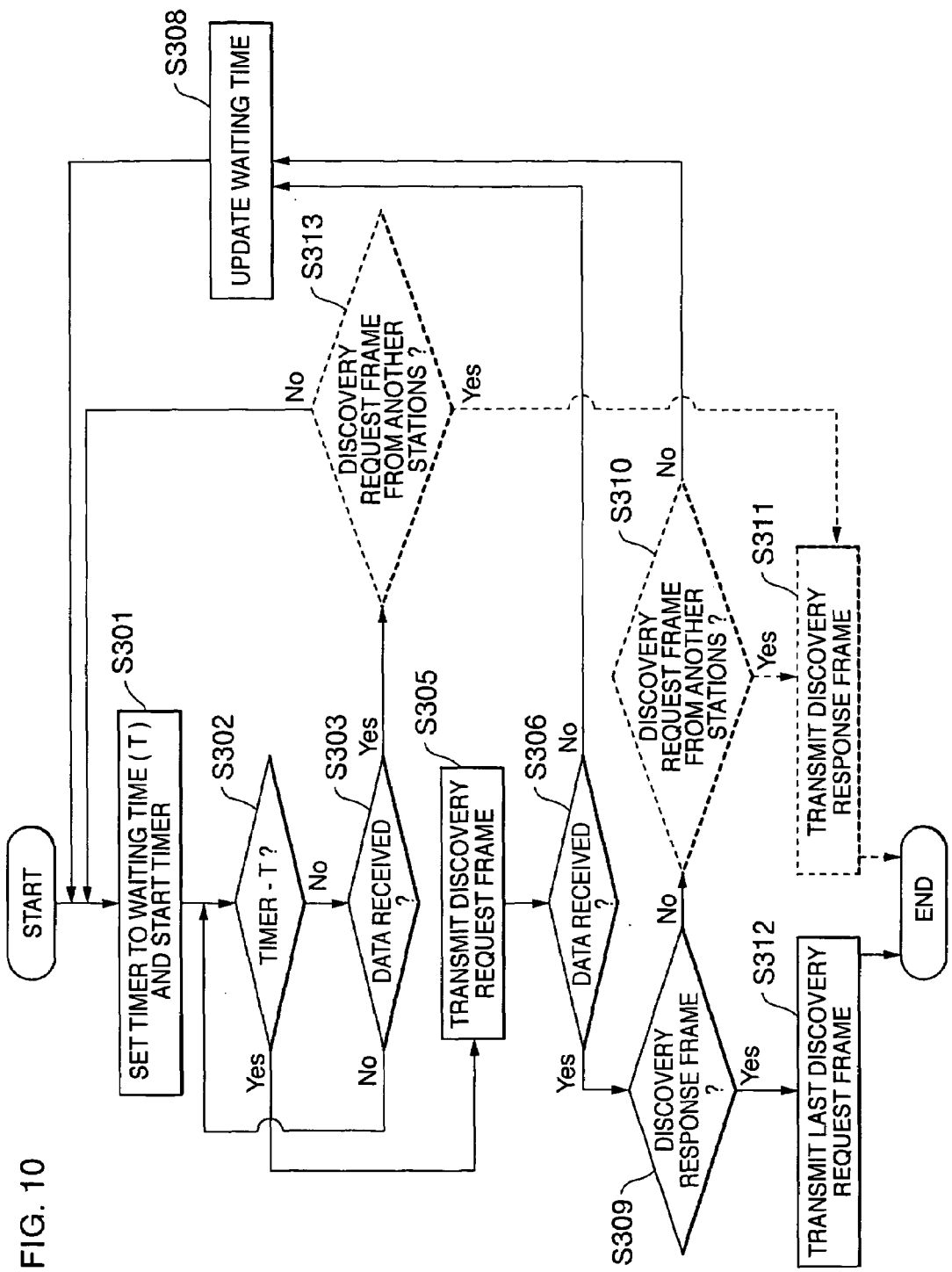
FIG. 10 is a flowchart showing the flow of station discovery processing in the infrared communication device according to the second embodiment of the present invention.

Next, the flow of the station discovery processing in the second embodiment is described with reference to FIG. 10. FIG. 10 shows the flow of processing after the receipt of a discovery request in the communication frame control part 3110 until the termination of the discovery processing. The communication frame control part 3110 starts the discovery processing upon receiving a discovery request, sets the value of waiting time (T) in the timer 3111, and starts the timer (step S301). Next, the communication frame control part 3110 determines whether or not the timer is equal to the waiting time (T) (step S302) and if not equal to T, monitors the reception of data for a given period of time (step S303). If no data is received, the communication frame control part 3110 determines again whether the timer is equal to the waiting time (T) (step S302).

If some data is received while the data reception is monitored, the data is sent to the communication frame control part 3110, which determines whether or not the received data is a discovery request frame from another station (step S313) If it is a discovery request frame, a discovery response frame is generated and immediately transmitted from the transmitting part 3120, the discovery processing is terminated, and the operation is switched to the responding station from the starting station. If data other than a discovery request frame is received, the received frame is discarded, the value of the waiting time (T) is set in the timer 3111, and the timer is stared (step S301) to perform the monitoring again.

When the timer 3111 of the communication frame control part 3110 becomes equal to T, the communication frame control part 3110 generates a discovery request frame and transmits it from the transmitting part 3120 (step S305). The receiving part 3130 determines whether data is received from a communication device of the transmission party, in response to the transmitted data (step S306). If data is received, it is sent to the communication frame control part 3110 to determine whether or not the received data is a discovery response frame (step S309) If it is a discovery response frame, a last discovery request frame is transmitted (step S312), and the discovery processing is terminated.

If the received data is not a discovery response frame, the communication frame control part 3110 determines whether or not it is a discovery request frame from another station (step S310). If it is a discovery request frame from another station, the communication frame control part 3110 generates a discovery response frame and immediately transmits it from the transmitting part 3120 to the another station (step S311). Thus, the discovery processing is terminated and the operation is switched to the responding station from the starting station. If data other than a discovery request frame is received, the received frame is discarded.

If no data is received in response to the transmission (step S305) of the discovery request frame (step S306), or if the received data is neither a discovery response frame nor a discovery request frame from another station (step S309, step S310), the communication frame control part 3110 issues a command for updating the waiting time (T) 3112 to the waiting time control part 3140. When the waiting time control part 3140 updates the setting value of the waiting time 3112 (step S308), the communication frame control part 3110 repeats the discovery processing on the basis of new waiting time (T).

In the updating of the setting value of waiting time 3112 (step S308), the waiting time control part 3140 may perform the updating if receiving the update commands Mn (positive integer) times. The waiting time control part 3140 may perform the updating if continuing receiving the update commands for time $^\Delta tn$ ($^\Delta tn$ is an optional positive number). When the communication frame control part 3110 issues a waiting time updating command to the waiting time control part 3140, the communication frame control part 3110 may generate a last discovery request frame and transmit it from the transmitting part 3120.

Of the flow of the above processing, the processing (steps S310 and S313) that the communication frame control part 3110 determines whether received data is a discovery request frame from another station may be omitted if the operation of the infrared communication device is limited to the operation as a starting station, in other words, the device does not need to receive discovery requests from other devices. Likewise, the processing (step S311) that transmits a discovery response frame may be omitted. In this case, when data is received within waiting time (step S303), control is returned to the processing immediately after the discovery processing is started, and when data received after timer expiration is not a discovery response frame (step S309) the waiting time is immediately updated (step S308).

Next, a description is made of a method of controlling waiting time. The waiting time control part 3140 has initial waiting time T1, maximum waiting time Tmax, other plural waiting times T2, T3, . . . , Tn (T1<T2<T3< . . . <Tn<Tmax), and updating intervals $^\Delta t1, ^\Delta t2, ^\Delta t3 \ldots, ^\Delta tn$. These values may be stored on memory. The values may be stored in a setting file. FIG. 12 shows an example of a correlation graph on waiting time setting values and processing time when n=3.

The infrared communication device in the second embodiment performs discovery processing on the basis of waiting time (T=T1) initially set in the communication frame control part 3110 when the station discovery processing is started. If receiving no response data for the time ($^\Delta$t1), the waiting time control part 3140 updates the waiting time 3112 of the communication frame control part 3110 to T2. The infrared communication device continues the station discovery processing on the basis of the waiting time (T=T2), and if receiving no response data for the time ($^\Delta$t2) again, the waiting time control part 3140 updates the waiting time 3112 of communication frame control part 3110 to T3. The infrared communication device continues the station discovery processing again on the basis of the waiting time (T=T3), and if receiving no response data for the time ($^\Delta$t3) again, the waiting time control part 3140 updates the waiting time 3112 to Tmax. After that, until a response is obtained, the station discovery processing is repeated with the waiting time 3112 fixed to Tmax.

If a user operation is performed (for example, the user pushes an operation button provided in the infrared communication device, or a sensor included in the infrared communication device senses that the user exists in front of the infrared communication device), or if response data (response) is obtained in response to discovery processing, the waiting time 3112 is reset to the initial waiting time T1 irrespective of the waiting time at that time.

The intervals ($^\Delta$t1, $^\Delta$t2, $^\Delta$t3, . . . , $^\Delta$tn) in which waiting time is updated may be constant. By thus updating waiting time, when station discovery processing is started, responding stations can be rapidly discovered in waiting time (for example, zero waiting time), and when no responding station is discovered, waiting time can be automatically extended to curb power consumption.

FIG. 11 shows an example of communication sequence between a starting station and responding stations of station discovery processing in the second embodiment. The initial waiting time T1 in the second embodiment is 0. Waiting time is updated each time. When the communication control part 3100 of the starting station starts station discovery processing, a discovery request is sent to the communication frame control part 3110 (step S401). The communication frame control part 3110 sets the setting value T1 of waiting time (T) in the timer and starts the timer. Since T1 is 0, the communication frame control part 3110 immediately generates an XID command frame and sends it to the transmitting part 3120 (step S402). The transmitting part 3120 transmits the XID command frame to other apparatuses (step S403).

If no data is received from other apparatuses in response to the transmission of the XID command, the communication frame control part 3110 notifies the waiting time control part 3140 that no data is received, and changes the waiting time (T) to T2 (step S404). The communication frame control part 3110 again sets the setting value T2 of waiting time (T) in the timer and starts the timer. When the timer becomes equal to T2, the communication frame control part 3110 generates an XID command frame and sends it to the transmitting part 3120 (step S405), and transmits the XID command frame to other apparatuses from the transmitting part 3120 (step S406).

If no data is received from other apparatuses, the communication frame control part 3110 notifies the waiting time control part 3140 that no data is received, and changes the waiting time (T) to T3 (step S407). The communication frame control part 3110 again sets the setting value T2 of waiting time (T) in the timer and starts the timer. When the timer becomes equal to T3, the communication frame control part 3110 generates an XID command frame and sends it to the transmitting part 3120 (step S408), and transmits the XID command frame to other apparatuses from the transmitting part 3120 (step S409). Upon receiving an XID response frame in response to the transmitted XID command frame (step S410), the receiving part 3130 sends the XID response frame to the communication frame control part 3110 (step S411), and the communication frame control part 3110 returns a discovery response to the communication control part 3100 (step 412), which terminates the station discovery processing.

According to the second embodiment, by updating waiting time during station discovery processing, depending on the discovery frequency of responding stations, wasteful consumption of power can be prevented. In other words, the modes of discovery processing can be automatically switched so that if responding stations appear frequently, the discovery processing is rapidly performed, and if responding stations appear infrequently, the discovery processing is performed with low power consumption.

Although the infrared communication device in the second embodiment has an optimal configuration for solving the problems of the prior art, it can be physically realized in various ways. For example, it may be realized as driver software of infrared communication I/F of personal computers, or the respective functions of the components of the infrared communication device are combined in proper units into hardware modules, and the infrared communication device may be realized by combining the hardware modules.

In the case of driver software of personal computer, for example, the function of the aforementioned communication control part 3100 is realized as software executed by the CPU of the personal computer. For realization by hardware, the hardware modules may be realized by wired logics or a microcomputer. For realization by a microcomputer, for example, the functions of the communication frame control part 3110 and the transmission distance control part 3140 described above are realized by software such as microcodes executed by the microcomputer.

The configuration and operation of an infrared communication device to which the present invention is applied have been described in detail. The present invention can also apply to other types of wireless communication devices that perform station discovery processing.

As has been described above, according to the station discovery processing method and the wireless communication device of the present invention, a response collision during discover processing can be prevented by controlling the transmission power of a starting station. Thereby, other wireless communication terminals existing within a minimum distance can be discovered rapidly and without fail.

The present invention has been described on the basis of the preferred embodiments shown in the drawings. It is apparent to those skilled in the art that the present invention may be easily changed and modified in various ways without departing from the spirit and scope of the present invention. The present invention includes such variants as well.

What is claimed is:

1. A station discovery processing method comprising the steps of:
    transmitting a discovery request frame for one station discovery processing;
    determining whether data is received, in response to the discovery request frame;
    when data is received in response to the discovery request frame, determining whether a transmission error of the received data is generated or not; and when there is a transmission error in the received data, determining a new shorter transmission distance and controlling transmission power of a transmitting part to a power level corresponding to the new transmission distance.

2. The station discovery processing method according to claim 1, wherein, in the step of determining the new transmission distance and controlling the transmission power of the transmitting part, a new transmission distance is determined distance is increased.

3. The station discovery processing method according to claim 1, further comprising the steps of:
    determining whether data received in response to the discovery request frame is a discovery request frame from another communication device; and
    if the received data is the discovery request frame from the other communication device, immediately transmitting a discovery response frame to the other communication device.

4. The station discovery processing method according to claim 2, further comprising the steps of:
    determining whether data received in response to the discovery request frame is the discovery request frame from another communication device; and
    if the received data is the discovery request frame from the other communication device, immediately transmitting a discovery response frame to the other communication device.

5. A station discovery processing method, comprising the steps of:
    determining whether data is received for a particular waiting time specified from among a plurality of waiting times from minimum waiting to maximum waiting time freely chosen;
    when no data is received for the specified waiting time, transmitting a discovery request frame for one station discovery processing;
    determining whether data is received in response to the transmission of the discovery request frame;
    when data is received in response to the transmission of the discovery request frame, determining whether the received data is a discovery response frame; and
    updating the waiting time longer when the received data is not a discovery response frame, or no data is received in response to the transmission of the discovery request frame.

6. The station discovery processing method according to claim 5, wherein in the step of updating waiting time, if a response is obtained in response to the discovery request frame, waiting time is initialized.

7. The station discovery processing method according to claim 5, further comprising the steps of:
    if data is received within the waiting time, or the received data is not a discovery response frame, determining whether the received data is a discovery request frame from another communication device; and
    if the received data is the discovery request frame from the other communication device, immediately transmitting a discovery response frame to the other communication device.

8. The station discovery processing method according to claim 6, further comprising the steps of:
    if the data is received within the waiting time, or the received data is not a discovery response frame, determining whether the received data is the discovery request frame from another communication device; and
    if the received data is the discovery request frame from the other communication device, immediately transmitting a discovery response frame to the other communication device.

9. A wireless communication device, comprising:
    a transmitting part that transmits data to other communication devices;
    a receiving part that receives data from other communication devices;
    a communication frame control part that generates the data to be transmitted from the transmitting part and detects data reception from the receiving part;
    a frame determining part that determines a frame type and validity of the data received from the receiving part;
    a transmission distance control part that decides a data transmission distance on the basis of notice from the communication frame control part and the frame determining part; and
    a power control part that controls transmission power of the data transmitted from the transmitting part so that the data is transmitted to other communication devices existing in a position of the transmission distance decided by the transmission distance control part;
    wherein when there is a transmission error in the data received from the receiving part in response to a discovery request frame transmitted from the transmitting part, the transmission distance control part decides a new shorter transmission distance, the power control part controls the transmission power of the data to be transmitted, and the transmitting part transmits the discovery request frame again.

10. The wireless communication device according to claim 9,
    wherein the transmission distance control part decides the new transmission distance so that if no data is received from the receiving part, the transmission distance is increased.

11. The wireless communication device according to claim 9,
    wherein the frame determining part determines the frame type of the data received from the receiving part, and if the frame type of the received data is a discovery request frame from another communication device, the communication frame control part generates a discovery response frame and the transmitting part immediately transmits the discovery response frame to the other communication device.

12. The wireless communication device according to claim 10,
    wherein the frame determining part determines the frame type of the data received from the receiving part, and if the frame type of the received data is the discovery request frame from another communication device, the communication frame control part generates the discovery response frame and the transmitting part immediately transmits the discovery response frame to the another communication device.

13. A wireless communication device of the present invention, comprising:
    a transmitting part that transmits data to other communication devices;
    a receiving part that receives data from other communication devices;
    a communication frame control part that generates the data to be transmitted from the transmitting part, transmits the generated data to the transmitting part after waiting for a particular waiting time specified from among a plurality of waiting times from minimum waiting to maximum waiting time freely chosen, and detects data reception from the receiving part; and a waiting time control part that decides waiting time before a discovery request frame is transmitted, on the basis of notice from the communication frame control part, wherein when no data is received from the receiving part in response to a discovery request frame transmitted from the transmitting part, the waiting time control part decides new longer waiting time and the transmitting part transmits the discovery request frame again after waiting for the new waiting time.

14. The wireless communication device according to claim 13, wherein the waiting time control part decides the new waiting time so that if a response is obtained from the receiving part in response to the discovery request frame, the waiting time is initialized.

15. The wireless communication device according to claim 13, wherein the communication frame control part determines a frame type of the data received from the receiving part, and if the frame type of the received data is a discovery request frame from another communication device, generates a discovery response frame, and the transmitting part immediately transmits the discovery response frame to the other communication device.

16. The wireless communication device according to claim 14, wherein the communication frame control part determines the frame type of the data received from the receiving part, and if the frame type of the received data is a discovery request frame from another communication device, generates the discovery response frame, and the transmitting part immediately transmits the discovery response frame to the other communication device.

* * * * *

UNITED STATES PATENT AND TRADEMARK OFFICE
CERTIFICATE OF CORRECTION

PATENT NO. : 7,406,093 B2
APPLICATION NO. : 10/768008
DATED : July 29, 2008
INVENTOR(S) : Junko Furuyama It is certified that error appears in the above-identified patent and that said Letters Patent is hereby corrected as shown below:

In claim 2, column 17, line 10, after the word "determined", insert --, so that if no data is received, the transmission--.

Signed and Sealed this

Twenty-fifth Day of May, 2010

David J. Kappos
*Director of the United States Patent and Trademark Office*